United States Patent
Saxena et al.

(10) Patent No.: US 11,696,098 B2
(45) Date of Patent: Jul. 4, 2023

(54) AUTOMATICALLY INFLUENCING UE SLICE POLICIES BASED ON REAL TIME ANALYSIS

(71) Applicant: HEWLETT PACKARD ENTERPRISE DEVELOPMENT LP, Houston, TX (US)

(72) Inventors: Ravi Saxena, Bangalore (IN); Bo Wang, Shanghai (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/192,792

(22) Filed: Mar. 4, 2021

(65) Prior Publication Data
US 2022/0286822 A1   Sep. 8, 2022

(51) Int. Cl.
H04W 4/24   (2018.01)
(52) U.S. Cl.
CPC ...................... *H04W 4/24* (2013.01)
(58) Field of Classification Search
None
See application file for complete search history.

(56) References Cited

U.S. PATENT DOCUMENTS

| | | | |
|---|---|---|---|
| 9,332,135 B1 | 5/2016 | Foottit et al. | |
| 11,128,716 B1 * | 9/2021 | Yan | H04W 4/24 |
| 11,310,733 B1 * | 4/2022 | Gupta | H04W 28/0268 |
| 2011/0151831 A1 * | 6/2011 | Pattabiraman | H04M 15/8353 455/466 |
| 2014/0066004 A1 | 3/2014 | Shaik et al. | |
| 2017/0289362 A1 | 10/2017 | Mathison | |
| 2019/0116097 A1 * | 4/2019 | Shimojou | H04W 28/18 |
| 2019/0174561 A1 * | 6/2019 | Sivavakeesar | H04W 48/12 |
| 2019/0260879 A1 * | 8/2019 | Raleigh | H04M 15/83 |
| 2020/0092423 A1 * | 3/2020 | Qiao | H04W 8/08 |

(Continued)

FOREIGN PATENT DOCUMENTS

| | | |
|---|---|---|
| EP | 3099013 A1 | 11/2016 |
| WO | WO-2017143047 A1 | 8/2017 |
| WO | WO-2020052789 A1 | 3/2020 |

OTHER PUBLICATIONS

Google Cloud, "Set budgets and budget alerts", Cloud Billing, available online at <https://cloud.google.com/billing/docs/how-to/budgets>, 2021, 17 pages.

(Continued)

*Primary Examiner* — Ernest G Tacsik
(74) *Attorney, Agent, or Firm* — Sheppard Mullin Richter & Hampton LLP

(57) ABSTRACT

Systems and methods define an enhanced charging function (CHF) in a communication network by creating a type of slice analysis functionality. For example, the system can access slice information from multiple Policy Control Functions (PCFs) and determine analytics for multiple slices associated with a subscriber user/device or group of subscriber users/devices. Using the enhanced CHF, the system can trigger slice level decisions at a higher level of the hierarchy based on information being aggregated for family devices/plans, category, quota, usage, or other groupings at the CHF instead of just at the individual slice level (e.g., similar to standard PCF functionality).

20 Claims, 10 Drawing Sheets

(56) References Cited

U.S. PATENT DOCUMENTS

| | | | |
|---|---|---|---|
| 2020/0092424 A1* | 3/2020 | Qiao | H04M 15/8033 |
| 2020/0145538 A1* | 5/2020 | Qiao | H04M 15/8038 |
| 2020/0177439 A1* | 6/2020 | Afzal | H04L 12/1403 |
| 2020/0195543 A1* | 6/2020 | Peng | H04M 15/853 |
| 2020/0267786 A1* | 8/2020 | Qiao | H04W 76/12 |
| 2020/0367109 A1* | 11/2020 | Chen | H04W 28/18 |
| 2020/0383043 A1* | 12/2020 | Wei | H04L 67/146 |
| 2021/0105652 A1* | 4/2021 | Jeong | H04W 4/24 |
| 2021/0136674 A1* | 5/2021 | Lee | H04W 48/18 |
| 2021/0153018 A1* | 5/2021 | Fernandez Alonso | H04W 12/08 |
| 2021/0368514 A1* | 11/2021 | Xing | H04L 41/5019 |
| 2021/0410211 A1* | 12/2021 | Patil | H04W 76/11 |
| 2022/0014562 A1* | 1/2022 | Garcia Azorero | H04L 43/08 |
| 2022/0191052 A1* | 6/2022 | Garcia Azorero | H04W 4/24 |
| 2022/0201601 A1* | 6/2022 | Cai | H04W 8/18 |

OTHER PUBLICATIONS

Samsung Electronics Co., Ltd., "Network Slicing," Technical White Paper, Apr. 2020, 22 pages, https://images.samsung.com/is/content/samsung/p5/global/business/networks/insights/white-paper/network-slicing/200420_Samsung_Network_Slicing_Final.pdf.

Tornkvist, R. et al., "Charging and Billing Architecture for 5G Network," Journal of ICT Standardization, May 20, 2019, pp. 185-194, vol. 7, No. 2, https://www.riverpublishers.com/journal_read_html_article.php?j=JICTS/7/2/8.

3GPP TS 23.501, "3rd Generation Partnership Project; Technical Specification Group Services and System Aspects; System architecture for the 5G System (5GS); Stage 2 (Release 15)", V15.11.0, 2020, 250 pages.

3GPP TS 23.502, "3rd Generation Partnership Project; Technical Specification Group Services and System Aspects; Procedures for the 5G System (5GS); Stage 2 (Release 16)", V16.7.1, 2021, 603 pages.

3GPP TS 29.594, "3rd Generation Partnership Project; Technical Specification Group Core Network and Terminals; 5G System; Spending Limit Control Service; Stage 3 (Release 16)", V16.4.0, 2020, 35 pages.

3GPP TS 32.240, "3rd Generation Partnership Project; Technical Specification Group Services and System Aspects; Telecommunication management; Charging management; Charging architecture and principles (Release 16)", V16.1.0, 2019, 61 pages.

3GPP, "3rd Generation Partnership Project; Technical Specification Group Core Network and Terminals; 5G System; Network Data Analytics Services; Stage 3", Release 15, V15.5.0, 2019, 39 Pages.

3GPP, "3rd Generation Partnership Project; Technical Specification Group Core Network and Terminals; 5G System; Policy and Charging Control signalling flows and QoS parameter mapping; Stage 3(Release 15)", V15.4.0, 2019, 87 pages.

3GPP, "3rd Generation Partnership Project; Technical Specification Group Services and System Aspects; Policy and Charging Control Framework for the 5G System (5GS); Stage 2 (Release 15)", V15.7.0, TS 23.503, 2019, 78 pages.

\* cited by examiner

AUTOMATICALLY INFLUENCING UE SLICE POLICIES BASED ON REAL TIME ANALYSIS

DESCRIPTION OF RELATED ART

In building communication networks, including next generation and 5G wireless networks, network slicing provides the ability to create isolated virtual networks over connections, where different traffic flows can travel as isolated traffic streams from other network slices. Network slicing in particular enables the multiplexing of virtualized and independent traffic streams on the same physical network infrastructure. Each network slice is an isolated end-to-end network tailored to fulfill diverse requirements required by different traffic types.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
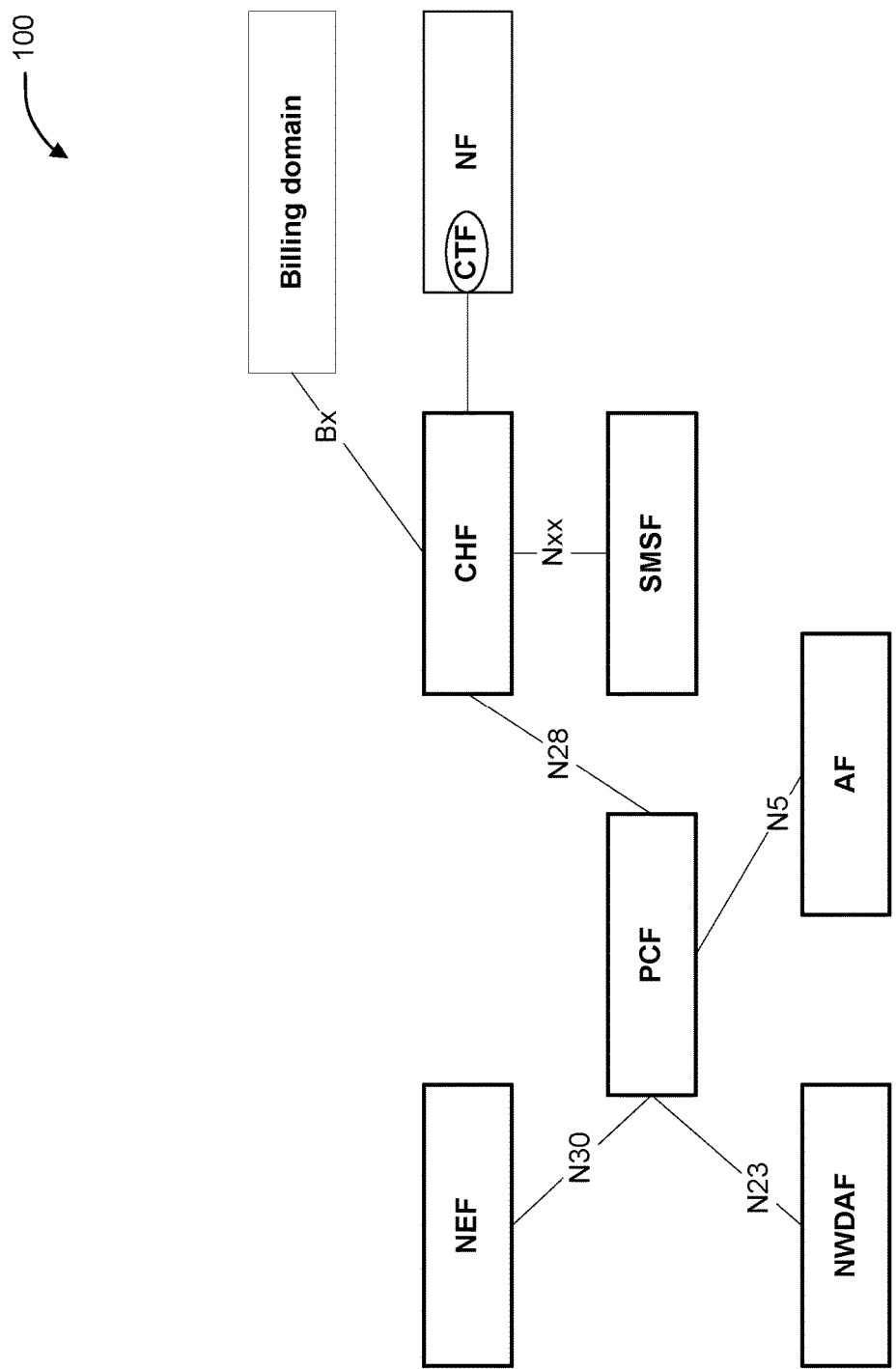
FIG. 1 is a block diagram of an example communication network policy framework architecture, in accordance with embodiments of the application.

The figures are not exhaustive and do not limit the present disclosure to the precise form disclosed.

DETAILED DESCRIPTION

Network slicing is a type of network architecture that enables network communication operators to deploy different configurations on the same network, for example, by implementing multiplexing of virtualized and independent logical networks on the same physical network infrastructure. Each network slice may correspond with an isolated end-to-end network tailored to fulfill diverse requirements requested by a particular application. As an illustrative example, a first network slice may transmit a large number of short transmissions for user equipment (UE) that do not need ultra-reliable connections. This network slice would differ in its configuration and resource demands from a network slice that is designed to serve the needs of a UE connecting to an enhanced broadband network. By providing slices with different network parameters and characteristics, services can be transmitted via slices that are designed to meet the needs of their traffic flows. Using multiple slices allow the network operator to ensure that the specific needs of a service are met without requiring the overprovisioning of resources for each UE and/or connection to the network with a single slice.

When using multiple services provided by the communication network (e.g., 5G network, etc.), data transferred between the network operator and the UE may be transmitted using these network slices. Various functions may enable these transmissions to be enabled, charged, and controlled, including the Charging Function (CHF) and the Policy Control Function (PCF). In general, the CHF is configured to monitor and charge the traffic flow and the PCF may make Policy and Charging Control (PCC) decisions based on spending limits that are stored in individual policy counters by the CHF. For each network function and corresponding slice, the slice may include its own PCF for policy application, which can influence charging rates. Multiple PCFs may interface with a central CHF (e.g., which can have a direct connection to an overall billing system). The CHF can manage the user or device's account and can provide insights to PCFs on how different services are consuming the account credit or monthly quota. Using this tracking data at the CHF, the PCF can adjust the per service/slice policies to manage credit or quote limits.

The CHF may also generate a spending limit report (i.e. to notify the PCF of policy counter status changes) and the PCF can retrieve the status of the policy counters available at the CHF. To access this data, the PCF subscribes (e.g., PCF sends the Nchf_SpendingLimitControl_Subscribe message to CHF for the policy counters notification) a list of policy counter identifier(s) to the CHF, and the CHF returns a status of each policy counter identifier subscribed by the PCF. If the PCF does not provide the list of policy counter identifier(s) to the CHF, the CHF may return the policy counter status of each policy counter(s), which are available for a particular subscriber. Using this information, the PCF can generate a policy decision depending on the policy counter status provided by the CHF.

Various limitations exist with the interactions and tracking performed by the PCF and CHF described in standard systems. For example, individual PCFs in standard systems are unable to access data usage information for different slices. As such, these individual PCFs are limited to data in a single slice and no function may identify aggregated data across a plurality of slices.

Embodiments of the application provide an enhanced CHF by enabling slice analysis functionality that improves existing slice analysis performed at the PCF level by implementing the analysis at the CHF. This may improve the functionality of the CHF because the CHF serves multiple PCFs and determines analytics for multiple slices associated with a subscriber user/device or group of subscriber users/devices. Using the enhanced CHF, the system can trigger slice level decisions at a higher level of the hierarchy based on information being aggregated for family devices/plans, category, quota, usage, or other groupings at the CHF instead of just at the individual slice level (e.g., similar to standard PCF functionality).

This enhanced CHF may be beneficial for several reasons. For example, triggering slice level decisions at a higher level of the hierarchy may provide more accurate decision-making that was unavailable previously. When reviewing data that is only available farther down the hierarchy (e.g., at the individual PCF level), decision-making may be limited to individual slices instead of an aggregate or network level. Additionally, aggregated slice-level information can help determine how each of these slices are impacting the network overall.

To implement this functionality at the CHF, new policy counters may be implemented to monitor data, perform analytics, and determine appropriate actions. The policy counters may include, for example, a slice usage rate, a slice usage, a slice action, and a slice User Equipment Route Selection Policy (URSP) target. The "slice usage rate policy counter" may determine the real-time slice consumption rate of a single subscriber user or group of subscriber users (e.g., a family plan). The "slice usage policy counter" may provide the leftover quota (e.g., of a predetermined quota of a data usage or service plan) for a given slice. The "slice action policy counter" may determine, for a particular slice, a slice action. The action may be instructed by the CHF and sent to the PCF for the PCF to execute. Potential actions can include, for example, NONE, MOVE (e.g., request PCF to initiate URSP for a given subscriber), and REJECT. The "slice URSP target policy counter" may identify a second slice that can receive the moved slice under the "slice action policy counter" function.

This improved functionality may be implemented in various use cases. For example, a subscriber user may subscribe to services that are spread across multiple slices between the UE and the operator, including Internet, gaming, and streaming video. In some cases, the subscriber user may be limited to data usage based on a particular quota and/or a data usage plan. The enhanced CHF may monitor slice usage rates, quota usage, slice congestion, and other metrics to determine an overall data usage and quality of service (QoS) experienced by the subscriber user. Based on the monitored metrics, the enhanced CHF may send a trigger slice action to the PCF, so that the PCF can perform some action (e.g., using the slice action policy counter).

In another example, the subscriber user may use an Internet slice more often than a gaming slice, causing the usage of the Internet slice to approach a threshold value. The enhanced CHF may identify the data usage for the particular slice and compare it with a threshold value. When the data usage for the internet slice nearly reaches the threshold value, the eCHF may transmit a trigger to PCF to perform some action in view of the usage data nearly reaching the threshold value. The action may include, for example, initiating a User Equipment Route Selection Policy (URSP) to move UE from slice X to slice Y for the Internet service, which might have a greater remaining capacity than slice X. The UE may use the remaining quota for the slice Y.

In another example, details associated with the subscriber user may be provisioned in the CHF. This may include subscriber information including a service category (e.g., Platinum, Gold, and Silver), minimum QoS associated with the subscriber user, and/or a maximum allowable traffic congestion between the UE and operator. When a value associated with the subscriber information exceeds a threshold value for a particular subscriber/service category, the data being transmitted on a first slice can be moved to a second slice. For example, the data can be moved to another slice (e.g., when slice congestion is too high, etc.) or based on individual quota threshold values. Moving the data may cause the value associated with the subscriber information to be adjusted and no longer exceed the threshold value. To move the data, the CHF may transmit a trigger notification to the PCF associated with the affected slice, so that the PCF can perform some action in view of the data nearly reaching the threshold value. Upon receipt of the trigger notification (e.g., that congestion is too high), the PCF may move some of the subscriber users to different slices (e.g., to free bandwidth on the particular slice and decrease congestion on the original slice).

In another example, the subscriber user may initiate a quota of data or services in accordance with a service plan. The details associated with the subscriber user may again be provisioned in the CHF. The service plan can deliver the data or services in multiple slices, where each slice can carry one or more services (e.g., Internet, gaming, streaming video, etc.). The individual slices and/or plurality of slices can be monitored in real-time by the CHF to determine data or service usage by the subscriber user. In some examples, the data or service plan may correspond with each slice individually (e.g., by each slice PCF) and may be aggregated for monitoring (e.g., by the CHF). In some examples, the real-time monitoring may be analyzed to determine usage for a time range and/or predict the amount of time remaining in a pre-determined service plan. The predicted date that the service plan may expire, based on predicted usage during a time range, may be transmitted in an alert notification to the subscriber user. The subscriber user may be able to alter their use of a particular service to maintain usage within the predetermined threshold for the time range. A quota exhaustion notification can be sent to the subscriber based on data rate (e.g., in comparison with a threshold, etc.). Once the quota is exhausted or service plan is expired, the CHF can suggest the slice action. The CHF can allow the usage as long as quota has not been exhausted. In case of recharge or plan renewal by the impacted subscriber, a new quota may be considered and the slices can be available for use by that subscriber.

In another example, the subscriber user may be a member of a group of devices (e.g., family plan, etc.) where the CHF identifies each UE associated with the group of devices. The particular data or service usage may be monitored by the CHF for the group of devices, each of which may utilize different slices to access data/services. If a subscriber user in the group of devices is attempting to access restricted content available on a particular slice, the CHF can send the slice action reject to the slice PCF, and access may be restricted. In some examples, an alert notification may be transmitted to a subscriber user associated with the group of devices (e.g., a parent or primary user, etc.).

In another example, the CHF can provide additional information to the PCF, which in turn can send the information and/or subscribe to Network Data Analytics Services (NWDAF) in the network on behalf of the enhanced CHF, which can identify whether a slice capacity and/or the slice's ability to transport additional service/data is reaching a threshold value (e.g., a slice load event). While the slice load is over a predefined threshold, one or more subscriber users may be removed from the slice (e.g., by each slice PCF). The subscriber users may be identified by the CHF based on user characteristics (e.g., silver category is removed from the slice while the gold category remains on the slice, etc.). The subscriber users that are removed from the slice can be added to a second slice, for example, by the CHF transmitting a trigger notification to the PCF associated with the affected slice to perform the move action.

Technical advantages are realized throughout the application. For example, aggregated information may be identified at a single location (e.g., the enhanced CHF) rather than initiating multiple transmissions between the CHF and PCF to manage individual slices. This results in fewer messaging transmissions and more efficient control of a group of subscribers and slices, including identifying data, monitoring usage, and moving subscribers from one slice to another.

FIG. 1 is a block diagram of an example communication network policy framework architecture, in accordance with embodiments of the application. A service-based representation of the overall non-roaming 5G network 100 is provided for illustrative purposes only, as any communication network may be implemented in accordance with the embodiments described herein.

The operations performed by the communication network can be implemented by various functions, some of which are described herein. The functions may include the Policy Control Function (PCF), the policy and charging enforcement functionality supported by the Session Management Function (SMF) and the User Plane Function (UPF), the access and mobility policy enforcement functionality supported by the Access and Mobility Management Function (AMF), the Network Data Analytics Function (NWDAF), the Network Exposure Function (NEF), the Charing Function (CHF), the Unified Data Repository (UDR), and the Application Function (AF).

These functions may enable operation of the 5G communication network. For example, the SMF may receive a session establishment request from the UE. The SMF selects the PCF and sends an HTTP POST request that provides, for example, the User Location Information, Serving Network, charging information, among other data. The request operation may also include a Notification URI to indicate to the PCF where to send a notification when the SM-related policies are updated. The PCF may request notifications from the UDR on changes in the subscription information and the UDR can acknowledge the subscription from the PCF.

If the PCF determines that the policy decision depends on the status of the policy counters available at the CHF, and such reporting is not established for the subscriber, the PCF initiates an Initial Spending Limit Report Retrieval. If policy counter status reporting is already established for the subscriber, the PCF may initiate an Intermediate Spending Limit Report Retrieval. The PCF can make a policy decision to determine the information provided in an HTTP "201 Created" message. The PCF can send the HTTP "201 Created" response to the SMF.

Once the connection is established, the SM policy association may be modified either by the SMF or by the PCF. For example, the PCF may receive an internal or external trigger to re-evaluate PCC Rules and policy decision for a Protocol Data Unit (PDU) session. Possible triggers may include, for example, when the UDR notifies the PCF about a policy subscription change (e.g. change in MPS EPS Priority, MPS Priority Level and/or IMS Signalling Priority, or change in user profile configuration indicating whether supporting application detection and control), or when the CHF provides a Spending Limit Report to the PCF. If the PCF determines that the policy decision depends on the status of the policy counters available at the CHF and such reporting is not established for the subscriber, the PCF can initiate an Initial Spending Limit Report. If policy counter status reporting is already established for the subscriber, and the PCF may decide to modify the list of subscribed policy counters, the PCF sends an Intermediate Spending Limit Report. If the PCF decides to unsubscribe any future status notification of policy counters, the PCF sends a Final Spending Limit Report Request to cancel the request for reporting the change of the status of the policy counters available at the CHF. The PCF can make a policy decision including, for example, that the updated or new policy information should be sent to the SMF.

Other functions are available as well. For example, Network Data Analytics Services (NWDAF) can identify whether a slice capacity and/or the slice's ability to transport additional service/data is reaching a threshold value (e.g., a slice load event). In another example, the user device may be provisioned with UE Route Selection Policy (URSP) information to provide information on which PDU Session on a network slice that the user device should use for a given service or application when it is activated.

Figure 2:
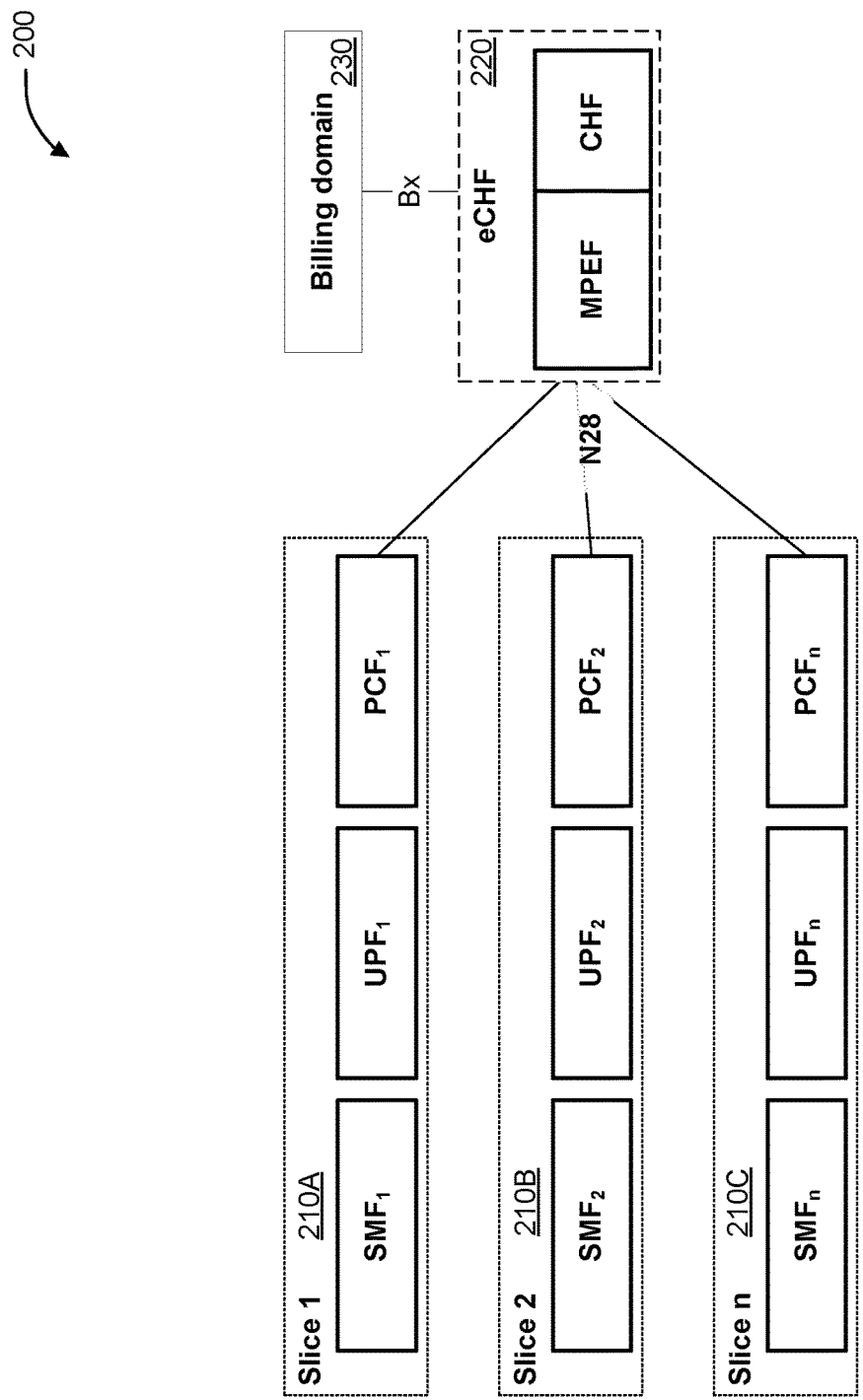
FIG. 2 is an example network including a plurality of slices, in accordance with embodiments of the application.

FIG. 2 is an example network including a plurality of slices, in accordance with embodiments of the application. In illustration 200, a plurality of slices 210 (illustrated as first slice 210A, second slice 210B, and third slice 210C) are communicatively connected with enhanced Charging Function (eCHF or CHF, used interchangably) 220, which is communicatively connected with billing domain 230. Each of the plurality of slices 210 comprises various functions, including Session Management Function (SMF), User Plane Function (UPF), and Policy Control Function (PCF).

Function eCHF 220 may not be part of the plurality of slices 210 and may comprise components of a charging function (CHF) and multi-slice policy enabler function (MPEF). Multiple PCF in the plurality of slices 210 may be associated with a single eCHF 220. Using this hierarchy, eCHF 220 can provide online and offline quota management services, spending limit notifications, and other analytics to each PCF in the plurality of slices 210.

Function eCHF 220 may be configured to collect real-time data usage analysis associated with subscriber charging rates, slice usages, policy counters, subscriber grouping like family plan, etc. Function eCHF 220 may generate one or more triggers based on this data usage analysis and transmitted to the corresponding PCF in the plurality of slices 210. The PCF would not be able to perform the data usage analysis in some cases, at least because the PCF would not have access to usage data from other slices in the plurality of slices 210 or the policies enforced by the other PCF in different slices of the plurality of slices 210.

Figure 3:
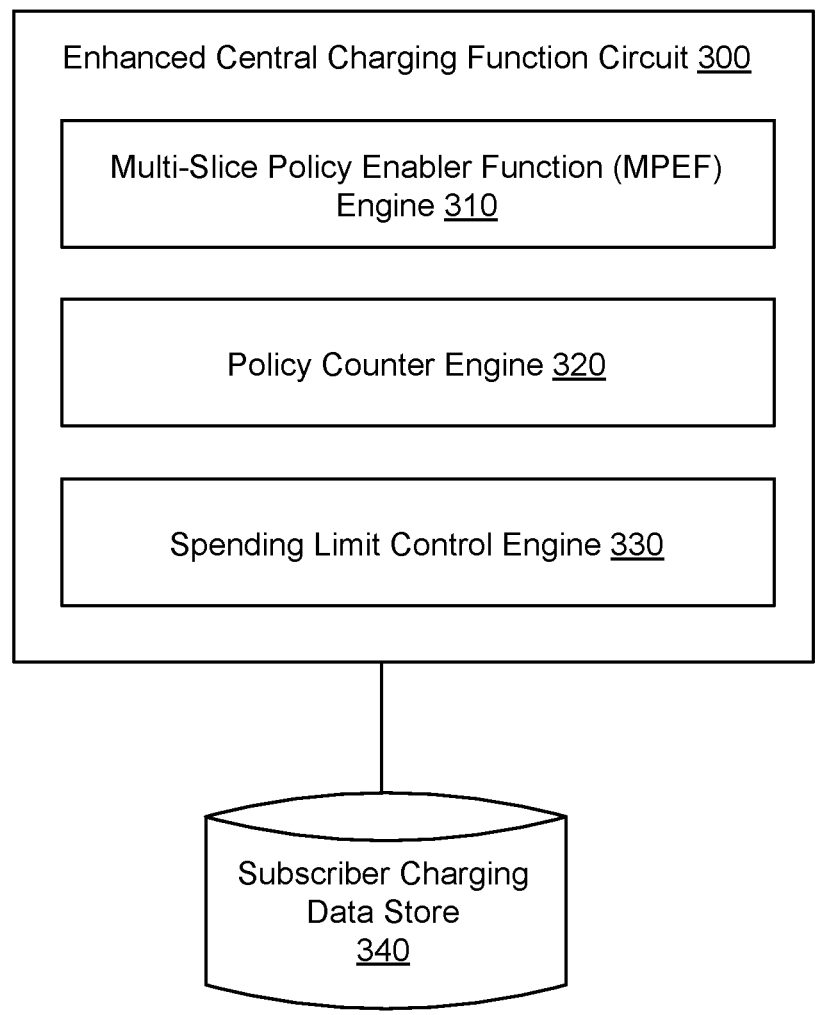
FIG. 3 is a block diagram of an example central charging function (CHF) circuit, in accordance with embodiments of the application.

FIG. 3 is a block diagram of an example central charging function (CHF) circuit, in accordance with embodiments of the application. CHF and eCHF may be used interchangeably. Central CHF circuit 300 may be configured with various engines, including multi-slice policy enabler function (MPEF) engine 310, policy counter engine 320, and spending limit control engine 330. Subscriber information may be accessible and stored at subscriber charging data store 340.

Multi-slice policy enabler function (MPEF) engine 310 is configured to provide features such as "Quota" (e.g., allocate quotas based on the request from NF consumer or receive quota usage to allocate subsequent quotas). MPEF engine 310 may provide enhanced components inside of a traditional CHF or coexist with a traditional CHF as defined by the 3GPP standard. MPEF engine 310 may also provide extra functionality to CHF to trigger decisions based on regular or enhanced features counters. MPEF engine 310 may provide the ability to calculate a data consumption rate for a UE or for family plan at CHF.

MPEF engine 310 is configured to provide features such as re-authorization triggers, a generation of a notification when the charging domain determines a network rating (e.g., throughput, QoS, etc.) is degraded, a generation of a notification when the CHF determines to terminate a charging service, or receiving service usage reports from NF Service Consumer (e.g., requesting and receiving the quota, sending service usage reports, handling quota re-authorization or abort notification, etc.), and/or CDRs generation. MPEF engine 310 may provide these features through an agreed set of counters which can be provided to each PCF. Each PCF may act as the policy enforcer and perform actions, or make decisions based on the counter values. With MPEF engine 310, the eCHF can perform added functionality to influence these policies.

MPEF engine 310 may detect offline and/or online charging mechanisms on multiple domain levels. The offline charging mechanisms may provide no disruption of services, whereas the online charging mechanisms may provide a disruption of services. When the data used exceeds the allocated quota, the service may continue but may be transferred to a lower throughput slice.

MPEF engine 310 is configured to perform real-time monitoring of data transmissions and other resource usage. The real-time monitoring of data transmissions may be performed on a single slice, a plurality of slices, or some subset thereof. Each of the slices may include a corresponding PCF that can communicate with MPEF engine 310 (as part of eCHF) to exchange data and perform operations.

MPEF engine 310 is configured to associate the resource usage with relevant chargeable events. In some examples, policies may be stored in a database. Using the stored policy information, the relevant chargeable events may be generated and associated with the resource usage.

MPEF engine 310 is configured to enable additional functionalities on CHF for individual subscribers to be subscribed or allowed usage of various network service slices (e.g., gaming, Internet, etc.) and also for the families, enterprise, or group plans (or other hierarchy-based plan) where multiple services are subscribed, each of which are deployed on various slices.

Policy counter engine 320 is configured to monitor data, perform analytics, and determine appropriate actions through the use of policy counters. The policy counters may include, for example, a slice usage rate, a slice usage, a slice action, and a slice User Equipment Route Selection Policy (URSP) target. Policy counter engine 320 may comprise known CHF counters (according to the standard) or operator defined counters which will be leveraged by MPEF engine 310. The counters can be related to just a subscriber, a group or family of subscribers, or may be specific to particular slices.

The "slice usage rate policy counter" may determine the real-time slice consumption rate of a single subscriber user or group of subscriber users (e.g., a family plan). For example, policy counter engine 320 may calculate the consumption data rate (or service used) based on the amount, size, and flow of traffic for each slice.

The "slice usage policy counter" may determine (e.g., estimate based on the current rate) and provide the leftover quota (e.g., of a predetermined quota of a data usage or service plan) for a given slice. In some examples, the "slice usage policy counter" may help notify a subscriber user how long the data will last based on the rate and/or the leftover quota.

The "slice action policy counter" may determine, for a particular slice, a slice action. The action may be instructed by the CHF and sent to the PCF for the PCF to execute. Potential actions can include, for example, NONE, MOVE (e.g., request PCF to initiate URSP for a given subscriber), and REJECT.

The slice action may be triggered by other factors as well. For example, an administrative user may determine that a first slice action is triggered when the data usage reaches a first threshold (e.g., 80%) and a second slice action is triggered when the data usage reaches a second threshold (e.g., 90%). In another example, a slice action may be triggered when QoS is below a quality threshold value (e.g., transmit an electronic communication to the UE, etc.). In another example, the slice action can be triggered based on an aggregated slice usage, other slice counters, congestion amount during a time frame, and the like, including examples provided herein.

The "slice URSP target policy counter" may identify a second slice that can receive the moved slice under the "slice action policy counter" function. Other policy counters are available as well. For example, the 3GPP standard may define details related to policy counters, where the interpretation and actions related to the defined values of the policy counters may be out of scope of the 3GPP standard. Various implementations are possible.

Spending limit control engine 330 is configured to determine a charge for data usage. Each of the network slices can have different charges due to targeted services offered by service providers or operators.

Spending limit control engine 330 may store subscriber information about subscriber user or group of subscriber users related to services, charges, and associated data allocation in subscriber charging data store 340. Subscriber charging data store 340 may comprise various information about a customer, device, plan package, quota, family device or plan, enterprise device or plan, or related group device. Subscriber charging data store 340 may differ from the UDR subscriber profile, which may store information at a network level, such as MSISDN, IMSI, DNN, authentication/authorization data, service profiles, and network policy information. In some examples, subscriber charging data store 340 associated with CHF maintains a subscriber specific charging profile as compared to the UDR which may maintain more generic data in terms of services.

Figure 4:
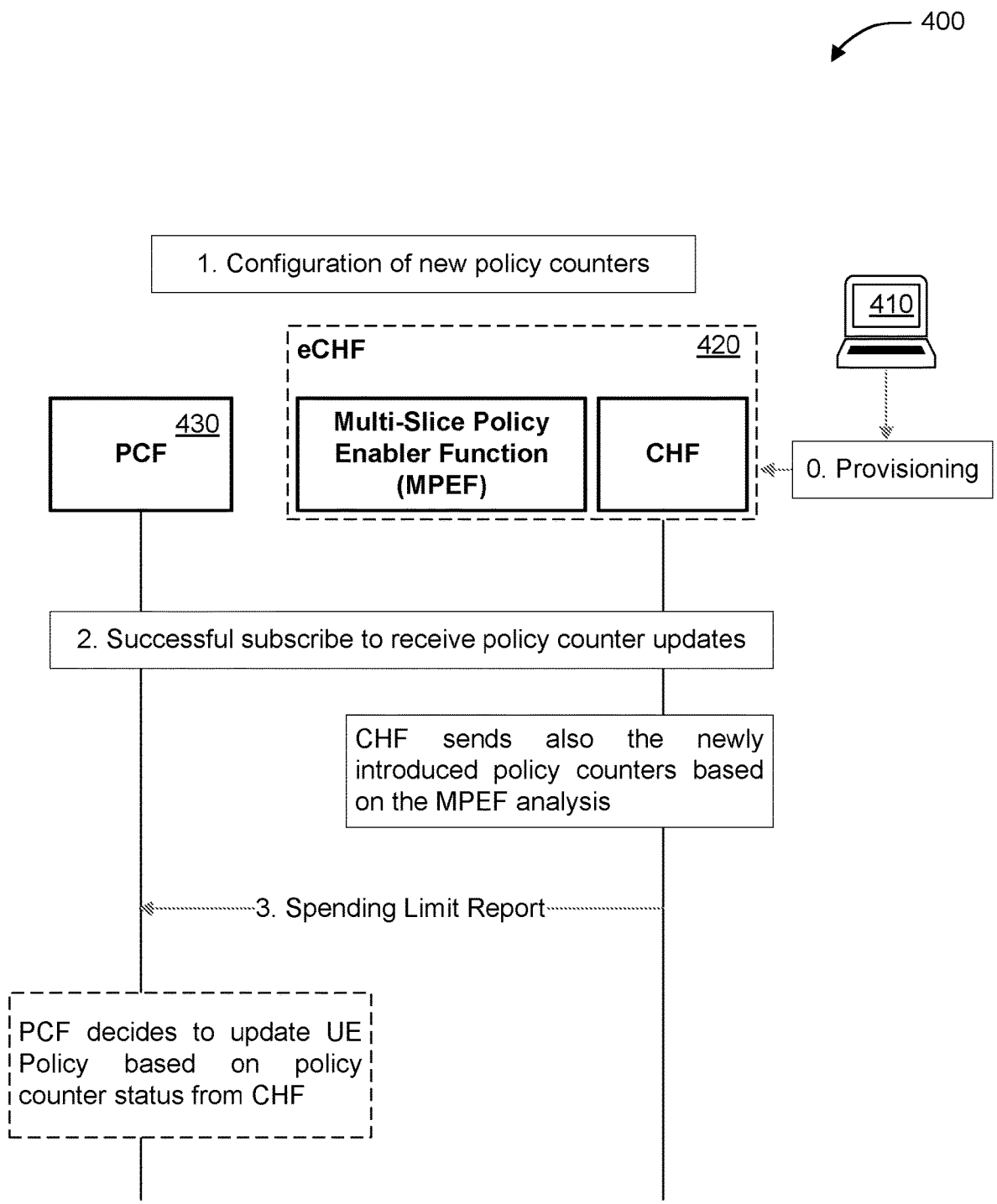
FIG. 4 provides an example illustrative interaction between CHF and a single PCF, in accordance with embodiments of the application.

FIG. 4 provides an example illustrative interaction between CHF and a single PCF, in accordance with embodiments of the application. This may help show the functionality added to and/or acquired from the PCF when implementing the enhanced CHF. In illustration 400, block 0 includes user 410 provisioning subscriber information to eCHF 420. eCHF 420 may store the subscriber information in a subscriber charging data store 340, as illustrated in FIG. 3.

At block 1, eCHF 420 may configure new policy counters associated with the provisioned subscriber information. The new policy counters may be associated with eCHF 420 and each slice in communication with eCHF 420. Each slice may include a corresponding PCF, illustrated as PCF 430. In some examples, PCF 430 may also have an understanding of the policy counters. This can be done by an automated process using a configuration file or at the time of deployment.

At block 2, PCF 430 may be subscribed to policy counter updates from eCHF 420. For example, the service consumer may subscribe to the policy counters from eCHF 420 in association with a particular PCF, including PCF 430. Any change to the policy counters may be sent as a notification to the consumer. PCF 430 may subscribe to policy counter updates, as described herein.

In some examples, a subscriber user may correspond with a subscribed Subscription Permanent Identifier (SUPT). The subscribed SUPI may be allocated to each subscriber and associated with a UE. eCHF 420 may send policy counters related to disclosure directly to the UE associated with the SUPI.

At block 3, eCHF 420 transmits a spending limit report to PCF 430. Upon receipt, PCF 430 determines whether to update a UE policy based on the policy counter status in the spending limit report from eCHF 420. This can help keep PCF 430 informed of the data usage and policy counters from eCHF 420, while eCHF 420 can track these and other metrics across all PCF/slices.

Figure 5:
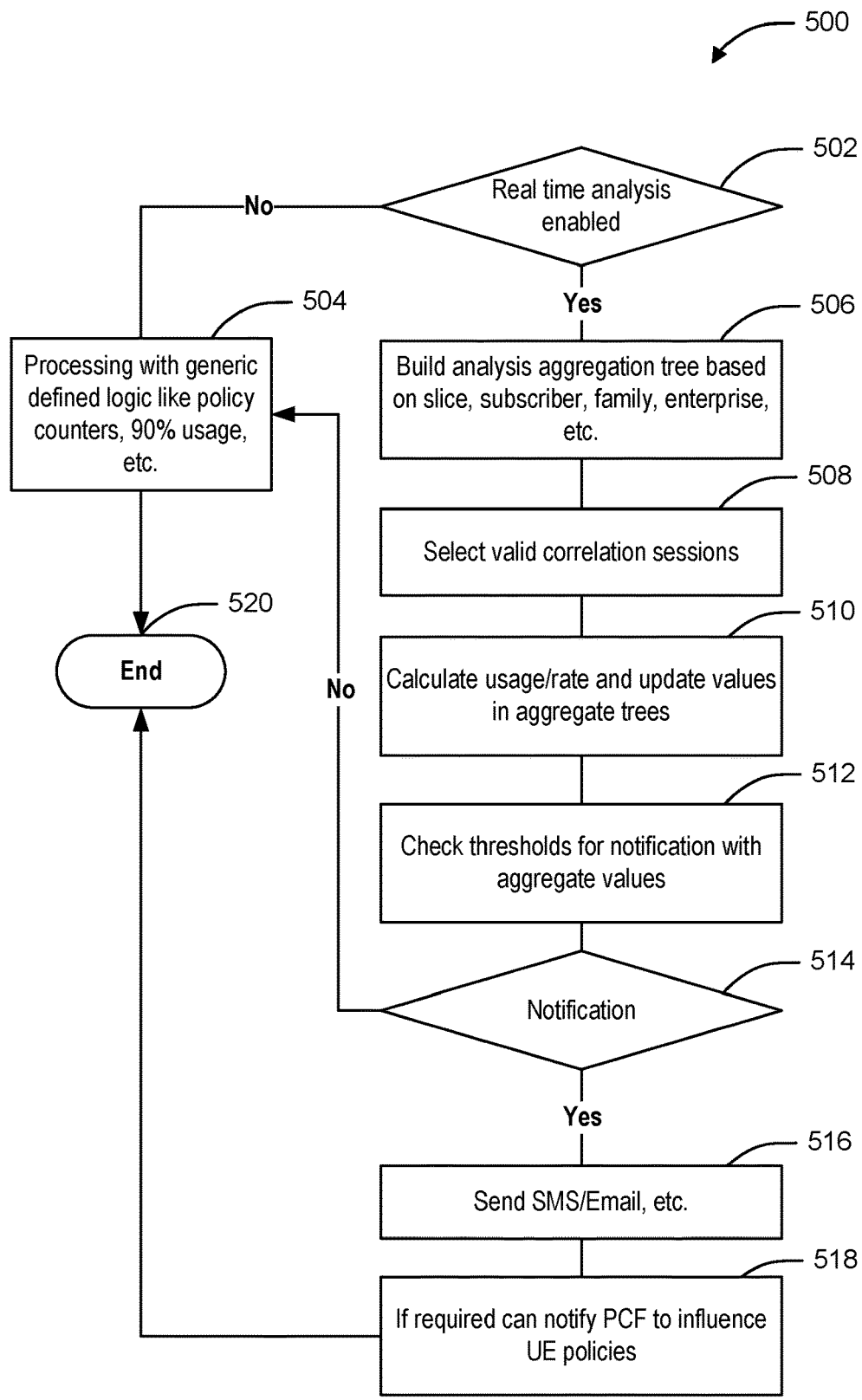
FIG. 5 is an example flow diagram for providing UE slice policies, in accordance with embodiments of the application.

FIG. 5 is an example flow diagram for providing UE slice policies, in accordance with embodiments of the application. In illustration 500, the logical flow for providing UE slice policies may be implemented by the CHF in communication with a plurality of PCF-enabled slices.

UE Route Selection Policy (URSP) may be used by the User Equipment (UE) or subscriber to determine how to route outgoing traffic. UE may be provisioned with URSP rules by PCF. When the UE is roaming, the PCF may update the URSP rule in the UE. The URSP rules provisioned by the PCF may be used by the UE for route selection.

At 502, the eCHF may identify subscriber users (e.g., prepaid or postpaid) that opted in for a real-time data analysis. The subscriber users may be identified based on the subscription request and/or list of policy counter identifier(s) sent from the PCF to the CHF. In some examples, the subscriber users may be automatically enrolled in the real-time data analysis without diverting from the disclosure. If yes, the method may proceed to 506. If no, the method may proceed to 504.

At 504, the eCHF may determine data usage using defined logic rules, including various policy counters described herein or comparing a data usage percentage with a threshold value. The method may proceed to 520.

At 506, the eCHF may analyze a subscriber profile based on multiple parameters, including slice, subscriber user, group or family users, enterprise data, etc. The subscriber profile may be stored in the UDR, which may be accessed directly by UDM, PCF, and NEF. The PCF may store am-policy data (association modification policy) and sm-policy data (session management policy) for each of the subscriber users (e.g., UE initial registration, AMF reallocation with/without a PCF change in a handover or registration procedure, etc.). The CHF may also keep a subscriber profile (e.g., monthly data usage allowed, service plan, QoS, etc.). In some examples, the PCF and CHF may transmit the subscriber charging counters between each other at the time of deployment and either the PCF or the CHF may control management and tracking of the counters after deployment. The PCF may also store policy rules which can be applied to the CHF.

In some examples, the eCHF may build an analysis aggregation tree based on this subscriber profile data. The analysis aggregation tree may be generated as an implementation of aggregation of subscriber profile data. As an illustrative example, a family has ten devices. The analysis aggregation tree can help to aggregate the family usage between the child devices.

At 508, the eCHF may select the correlation sessions. For example, using the illustrative example of a family plan with a plurality of devices, each of the plurality of devices may have their own session. The correlation between these devices and the sessions may occur at the family level by the system.

At 510, the eCHF may calculate usage data, rate data, and/or slice data rate usage. The calculated values may correspond with a duration of use or other time measurement. In some examples, the usage rate may be calculated in association with the slice usage rate policy counter. The usage rate may determine an estimated time duration when the quota value should exceed the maximum data allowed for the subscribed slices.

In some examples, the eCHF may also update the values in the aggregation tree. Using the illustrative example of a family plan with ten devices, the device usage may occur at child devices and the quota is shared among each devices. The aggregation of the device usage can be aggregated from the child devices to impact the quota for the family or group of devices. The reduction in available quota or available device usage may be illustrated in the aggregation tree as well.

At 512, the eCHF may compare threshold values with the calculated aggregate values (e.g., data usage, throughput, QoS, etc.). The method may proceed to 514.

At 514, the eCHF may determine whether the threshold values are met and, if so, the eCHF may generate an alert notification to identify the aggregate values that are too high or the like. If no, the method may proceed to 504. If yes, the method may proceed to 516.

At 516, the eCHF may trigger, generate, and send the alert notification (e.g., via SMS, email, etc.). The alert notification may comprise, in some examples, slice quota consumption details, a current consumption rate, a time duration that the data is estimated to exceed a threshold value based on the calculated consumption rate, service provider offers or details associated with the subscriber user, service, or slice, or other real-time monitoring data. In some examples, the subscriber user may be able to alter their use of a particular service to maintain usage within the predetermined threshold for the time range. The method may proceed to 518.

At 518, the eCHF may provide similar data to the PCF. The PCF may change the subscriber policy and/or metrics for a particular slice. When NWDAF is implemented, the eCHF can also identify whether a slice capacity and/or the slice's ability to transport additional service/data is reaching a threshold value (e.g., a slice load event). The method may proceed to 520.

At 520, the method may end.

Figure 6A:
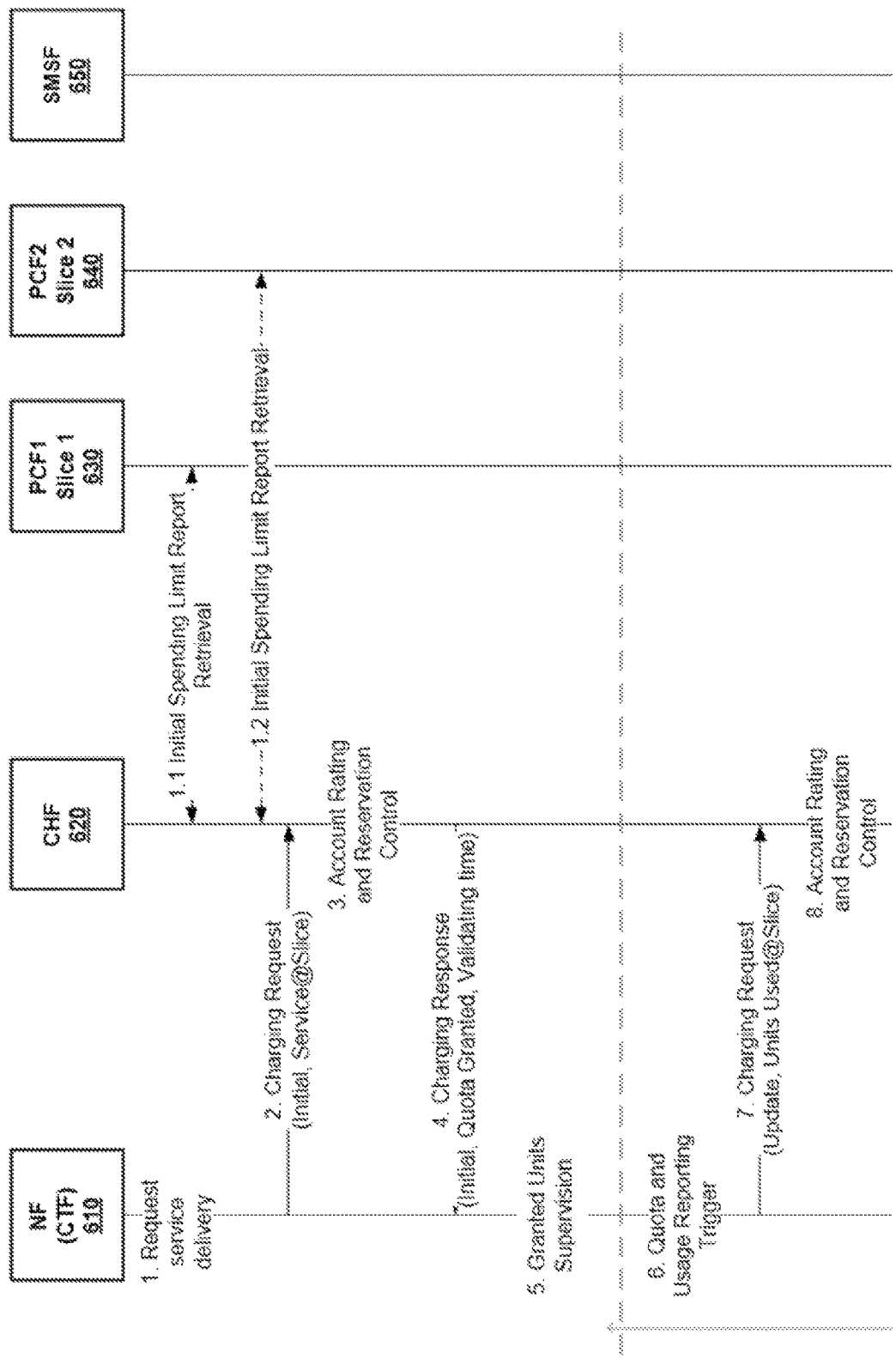
FIGS. 6A-6B is an example sequence diagram for enforcing UE slice policies, in accordance with embodiments of the application.
Figure 6B:
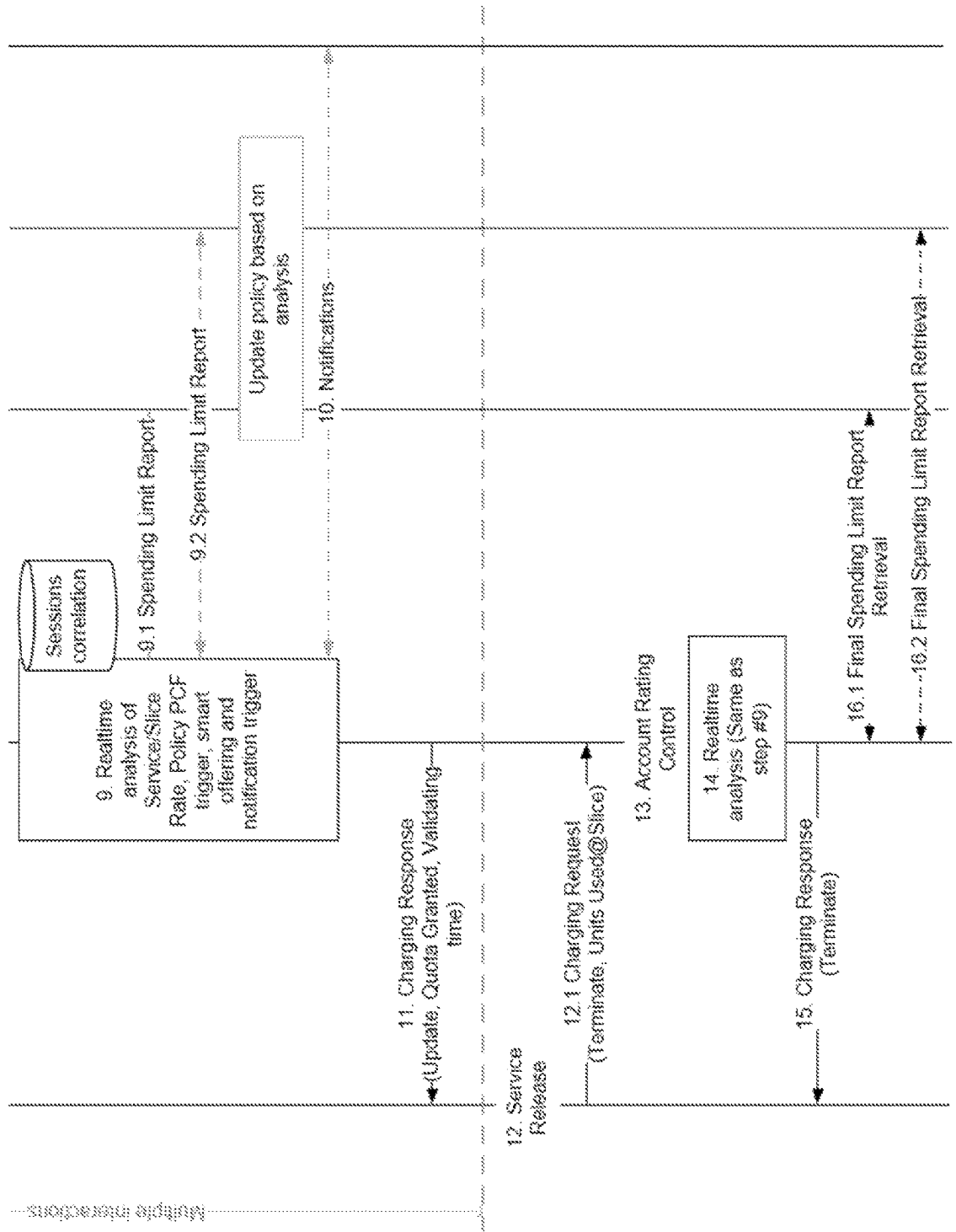

FIGS. 6A-6B is an example sequence diagram for enforcing UE slice policies, in accordance with embodiments of the application. FIGS. 6A-6B illustrate a single flow across a two-page, continued single drawing. The method may provide usage and slice data from CHF to PCF, so that the data may be used by other functions in the communication network, including Application Function (AF), Network Exposure Function (NEF), Network Data Analytics Services (NWDAF), and the like.

In some examples, different subscriber users can have same (or different) charges for the same slice. The method can leverage CHF functionality (e.g., provisioning, etc.) in order to purchase different plans/packages for different subscribers.

The method may also refresh the quota if the subscriber individual or family plan is recharged with one-time or regular data. For example, the quota may be refreshed on a predetermined cycle (e.g., monthly, etc.). In another example, the plans/packages may include refresh terms, for example, plan 1 is one-time 10G for $5 per month and plan 2 is 10G for $4 per month.

At block 1, NF 610 may request service delivery.

At block 1.1, CHF 620 may generate and transmit an initial spending limit report to first PCF 630.

At block 1.2, CHF 620 may generate and transmit an initial spending limit report to second PCF 640.

At block 2, NF 610 may transmit a charging request to CHF 620. The charging request may comprise one or more parameters, including initial and service at the slice, or a notification URI corresponding with the request. In some examples, the charging request may comprise parameters in association with the 3GPP standard to create a notification for quotas or service usage report.

At block 3, CHF 620 may determine account rating and reservation control. In some examples, the account rating and reservation control may correspond with the 3GPP standard for charging data generation and quota supervision.

At block 4, CHF 620 may transmit a charging response to NF 610. The charging response may comprise one or more parameters, including initial, quota generated, and validating time. In some examples, the response may correspond with the 3GPP standard, including providing parameters associated with block 2 as part of the response.

At block 5, NF 610 may determine granted units supervision. For example, the amount of resources that the end user may eventually consume may be unknown. In this case, a certain amount of (monetary or non-monetary) units may be blocked (e.g., reserved) on the subscriber's account, and permission to use an amount of resources that matches the unit reservation may be returned to the network. When the granted units have been used or a new, not yet authorized chargeable event occurs, the network may send a new request for unit allocation. When resource usage has been executed, the actual amount of resource usage (i.e. the used units) may be returned so that eventually over-reserved amounts can be re-credited to the subscriber account, assuring that the correct amount gets debited.

At block 6, NF 610 may determine quota and usage reporting triggers.

At block 7, NF 610 may transmit a charging request to CHF 620. The charging request may comprise one or more parameters, including update and units used at the slice. For example, the update may correspond with the granted service units for one rating group that are spent by the subscriber, expiry of granted service units' validity time, identification of any charging events that may occur that can affect the rating of the current service, receiving a re-authorization notification from CHF 620, and the like.

At block 8, CHF 620 may determine account rating and reservation control.

At block 9, CHF 620 may generate real-time analysis of service/slice usage rates, policy PCF trigger (e.g., the policy counter), smart offering (e.g., calculate a second plan based on previous usage and send a notification to offer the second plan), and alert notification trigger. Any data generated may be stored in a data store associated with CHF 620 and used to generate one or more spending limit reports that are transmitted to various PCFs.

At block 9.1, CHF 620 may transmit a first spending limit report to first PCF 630. First PCF 630 may update one or more policies associated with a UE based on the received first spending limit report.

At block 9.2, CHF 620 may transmit a second spending limit report to second PCF 640. Second PCF 640 may update one or more policies associated with a UE based on the received second spending limit report.

At block 10, CHF 620 may transmit one or more notifications to Short Message Service (SMS) function (SMSF) 650. The notifications may be transmitted by SMSF 650 to a UE using SMS, email, carrier app notification, or other communication mediums implemented in various systems.

At block 11, CHF 620 may transmit a charging response to NF 610. The charging response may comprise one or more parameters, including update, quota granted, and validating time.

In some examples, blocks 6 through 11 may be repeated for multiple interactions.

In some examples, a quota for a particular subscriber user and/or slice may be exhausted. Once the quota is exhausted, CHF 620 can either terminate the session or continue in excess of the predetermined quota (e.g., using on demand charging). This method can also suggest few actions like requesting the first PCF 630 or second PCF 640 to trigger UE Route Selection Policy (URSP) to move the subscriber user and corresponding UE from one slice to another based on rate and leftover data.

At block 12, NF 610 may provide a service release.

At block 12.1, NF 610 may transmit a charging request to CHF 620. The charging request may comprise one or more parameters, including terminate and units used at the slice.

At block 13, CHF 620 may determine account rating control.

At block 14, CHF 620 may repeat block 9. For example, CHF 620 may generate real-time analysis of service/slice usage rates, policy PCF trigger, smart offering, and alert notification trigger. Any data generated may be stored in a data store associated with CHF 620 and used to generate one or more spending limit reports.

At block 15, CHF 620 may transmit a charging response to NF 610. The charging response may comprise one or more parameters, including terminate.

At block 16.1, CHF 620 may generate and transmit a final spending limit report to first PCF 630.

At block 16.2, CHF 620 may generate and transmit a final spending limit report to second PCF 640.

As illustrated, a PCF is implemented with each slice in a plurality of slices. When a central PCF is implemented for a plurality of slices, rather than a PCF being implemented with each slice in the plurality of slices, then blocks 1.2, 9.2, and 16.2 may be removed from the aforementioned method.

Figure 7:
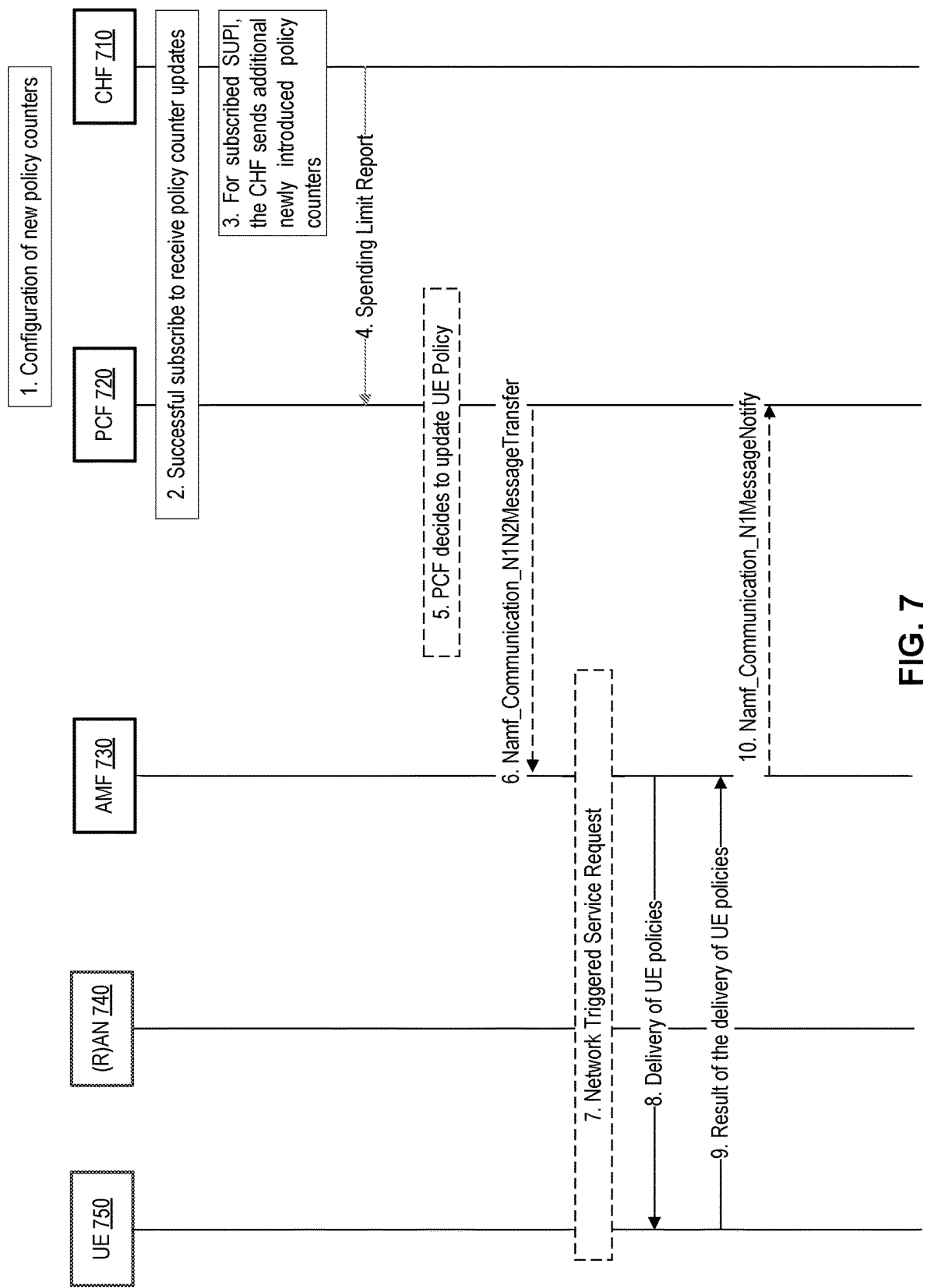
FIG. 7 is an example sequence diagram for distributing new policy counters, in accordance with embodiments of the application.

FIG. 7 is an example sequence diagram for distributing new policy counters, in accordance with embodiments of the application. In illustration 700, a UE Route Selection Policy (URSP) is provided from PCF 720 to UE 750. The interactions may help UE 750 determine how to route outgoing traffic in the communication network. Traffic can be routed to an established PDU Session (e.g., end-to-end user plane connectivity between the UE and a specific Data Network (DN) through the User Plane Function (UPF), etc.), can be offloaded to non-3GPP access outside of the PDU Session, or can trigger the establishment of a new PDU Session. In some examples, UE 750 may be provisioned with URSP rules by PCF of the Home Public Land Mobile Network (HPLMN). The HPLMN may identify the Public Land Mobile Network (PLMN) in which the subscribers profile is held. When the UE is roaming, the PCF in the HPLMN may update the URSP rule in the UE.

At block 1, new policy counters may be configured between PCF 720 and CHF 710.

At block 2, PCF 720 may successfully subscribe to receive policy counter updates from CHF 710.

At block 3, CHF 710 may send additional newly introduced policy counters to a subscriber user that corresponds with a subscribed Subscription Permanent Identifier (SUPT).

At block 4, a spending limit report may be transmitted from CHF 710 to PCF 720.

At block 5, PCF 720 may decide to update the UE policy (e.g., based on a received spending limit report from the CHF, etc.).

At block 6, PCF 720 may invoke the Namf_Communication_N1N2 MessageTransfer service operation to AMF 730 to establish the User Plane(s) for the PDU Sessions.

At block 7, AMF 730, (R)AN 740, and UE 750 may perform a network triggered service request. This procedure may be used when the network needs to signal (e.g., N1 signalling to UE 750, Mobile-terminated SMS, User Plane connection activation for PDU Session(s) to deliver mobile terminating user data, etc.) with UE 750.

Various processes may be implemented. For example, if UE 750 is in CM-IDLE state, and asynchronous type communication is not activated, the network may send a Paging Request to (R)AN 740 or UE 750. The Paging Request can trigger the UE Triggered Service Request procedure in the UE 750. If asynchronous type communication is activated, the network stores the received message and forward the message to the (R)AN 740 and/or the UE 750 (i.e. synchronizes the context with the (R)AN and/or the UE) when the UE 750 enters CM-CONNECTED state. For URSP rules, UE 750 may support the provisioning from the PCF in the HPLMN. If both URSP rules provisioned by the PCF 720 and pre-configured URSP rules are present, only the URSP rules provisioned by the PCF 720 may be used by the UE 750.

At block 8, AMF 730 may deliver the UE policies to UE 750.

At block 9, UE 750 may transmit a result of the delivery of the UE policies to AMF 730. In some examples, the result may refer to the delivery and updates of policies to the UE, including a parsed result of UE policy, which can be executed by AMF.

At block 10, AMF 730 may invoke the Namf_Communication_N1MessageNotify service operation to PCF 720. The service operation may include an Uplink Positioning message and an LCS Correlation identifier. New assistance data and/or a request for further location information and further UE capabilities.

Figure 8:
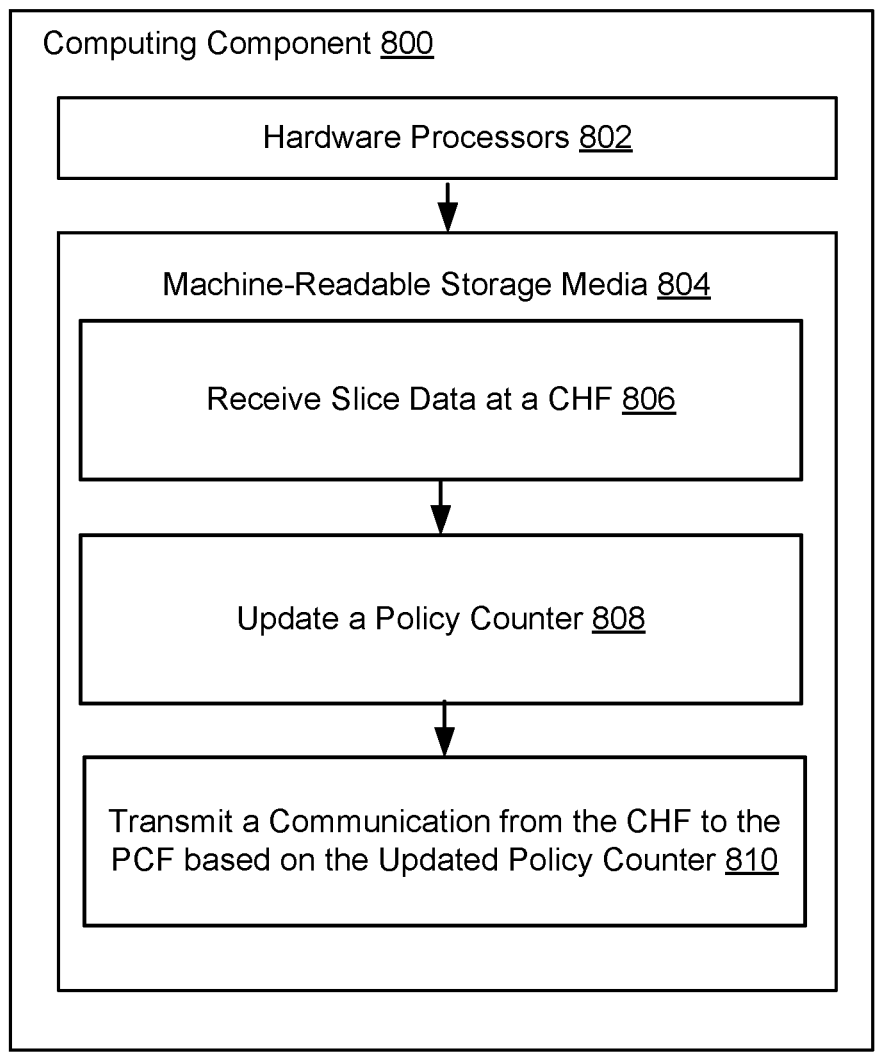
FIG. 8 is a block diagram illustrating an example computing component for providing UE slice policies, in accordance with embodiments of the application.

FIG. 8 is a block diagram illustrating an example computing component for providing UE slice policies, in accordance with embodiments of the application. Computing component 800 may be, for example, a server computer, a controller, or any other similar computing component capable of processing data. In the example implementation of FIG. 8, the computing component 800 includes a hardware processor 802, and machine-readable storage medium 804. In some embodiments, computing component 800 may be an embodiment of a system corresponding with the service-based representation of the overall non-roaming 5G network 100 of FIG. 1.

Hardware processor 802 may be one or more central processing units (CPUs), semiconductor-based microprocessors, and/or other hardware devices suitable for retrieval and execution of instructions stored in machine-readable storage medium 804. Hardware processor 802 may fetch, decode, and execute instructions, such as instructions 806-810, to control processes or operations for optimizing the system during run-time. As an alternative or in addition to retrieving and executing instructions, hardware processor 802 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 804, may be any electronic, magnetic, optical, or other physical storage device that contains or stores executable instructions. Thus, machine-readable storage medium 804 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 804 may be a non-transitory storage medium, where the term "non-transitory" does not encompass transitory propagating signals. As described in detail below, machine-readable storage medium 804 may be encoded with executable instructions, for example, instructions 806-810.

Hardware processor 802 may execute instruction 806 to receive slice data. For example, hardware processor 802 may receive slice data from a plurality of Policy Control Function (PCF). The hardware processor may be associated with a Charging Function (CHF) of a 5G communication network.

Hardware processor 802 may execute instruction 808 to update a policy counter. Updating the policy counter may be implemented in various ways.

In some examples, hardware processor 802 may determine a policy counter based on the slice data. The policy counter may correspond with at least one of a slice usage rate, a slice usage, a slice action, and a slice User Equipment Route Selection Policy (URSP) target. The policy counter may correspond with a subscriber user that utilizes a plurality of slices for data transfer on the 5G communication network. The plurality of slices may each correspond with the plurality of PCF, respectively. Using the policy counter, hardware processor 802 may determine an overall data usage or quality of service (QoS) experienced by the subscriber user using the plurality of slices.

Hardware processor 802 may execute instruction 810 to transmit a communication from the CHF to the PCF based on the updated policy counter. In some examples, transmitting an electronic communication to the PCF of the plurality of Policy Control Function (PCF) from the CHF may trigger a slice action by the PCF based on the updated policy counter.

In some examples, the policy counter is associated with a real-time slice consumption rate of a subscriber plan or a family plan.

In some examples, the policy counter is associated with a leftover quota on a given slice.

In some examples, the policy counter is associated with instructing a PCF of the plurality of PCF to perform an action to execute locally at the PCF.

In some examples, the CHF comprises a multi-slice policy enabler function (MPEF) to allocate quotas.

In some examples, hardware processor 802 may further execute instructions to generate an alert notification that includes slice quota consumption details of the plurality of slices; and transmit the alert notification to the subscriber user.

In some examples, the overall data usage is associated with a family or group plan.

In some examples, the slice action is based on parenting controls set by the subscriber user in a family or group plan.

In some examples, the slice action moves the subscriber user to a different slice of the plurality of slices based on a slice congestion of a slice currently used by the subscriber user.

Other implementations are available as well. For example, hardware processor 802 may execute an instruction to receive a plurality of slice data. The slice data may be received at a Charging Function (CHF) of a 5G communication network from a plurality of Policy Control Function (PCF). A subset of the plurality of slice data may correspond with a PCF from the plurality of PCF. Each PCF of the plurality of PCF may correspond with a slice from a plurality of slices.

Hardware processor 802 may execute an instruction to receive subscriber user information. The subscriber user information may include a minimum quality of service (QoS) value associated with the subset of the plurality of slice data. The subset of the plurality of slice data may correspond with the subscriber user and a subset of the plurality of slices.

Hardware processor 802 may execute an instruction to compare an actual QoS value with the minimum QoS value.

Hardware processor 802 may execute an instruction to transmit an electronic communication to a PCF. The electronic communication may be generated when the actual QoS value is less than the minimum QoS value. The electronic communication may trigger a slice action by the PCF on the subset of the plurality of slices to increase the actual QoS value.

Figure 9:
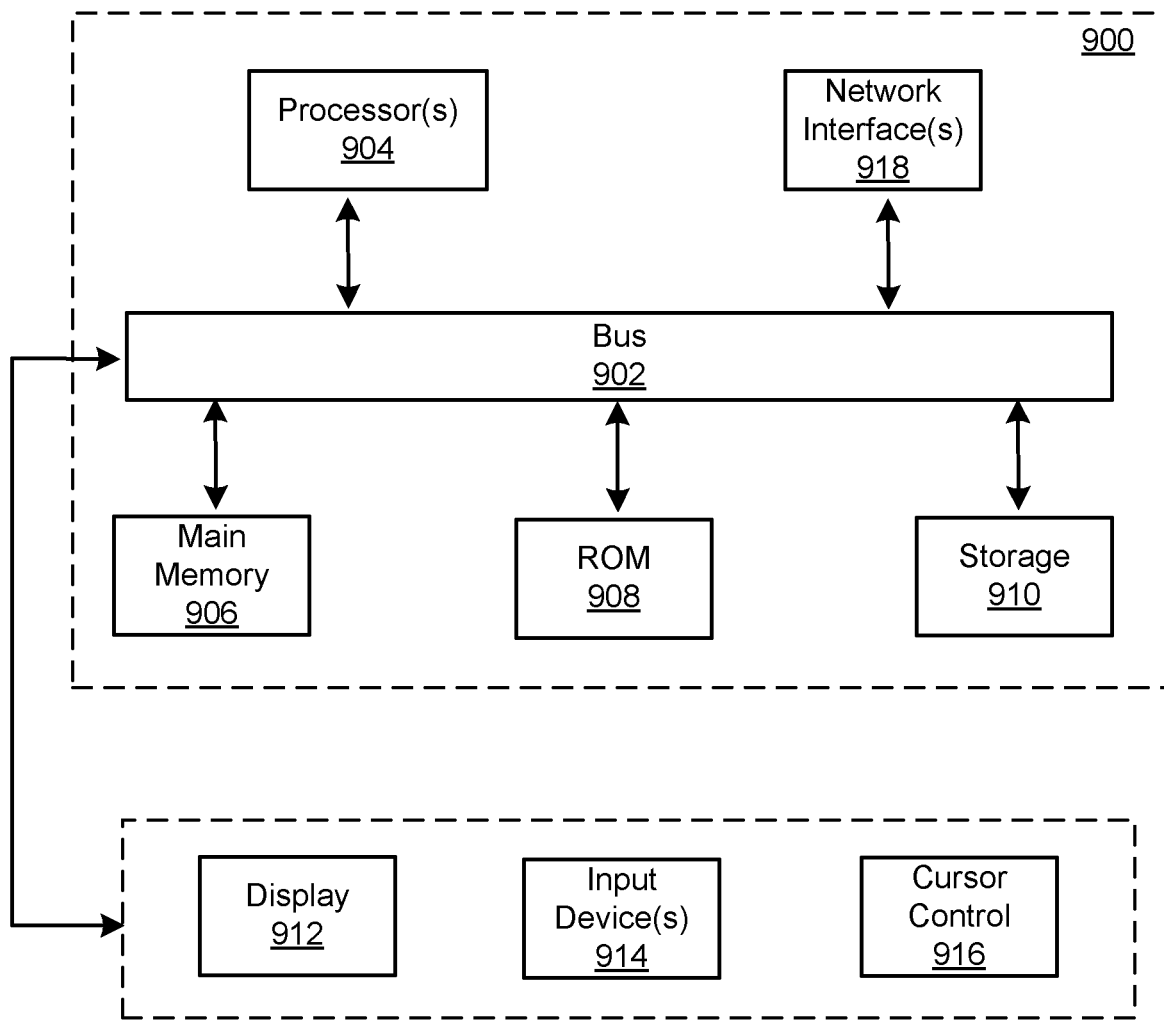
FIG. 9 is a block diagram of an example computing component that may be used to implement various features of embodiments described in the present disclosure.

FIG. 9 depicts a block diagram of an example computer system 900 in which various of the embodiments described herein may be implemented. The computer system 900 includes a bus 902 or other communication mechanism for communicating information, one or more hardware processors 904 coupled with bus 902 for processing information. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

The computer system 900 may be coupled via bus 902 to a display 912, such as a liquid crystal display (LCD) (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. In some embodiments, the same direction information and command selections as cursor control may be implemented via receiving touches on a touch screen without a cursor.

The computing system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

The computer system 900 also includes a communication interface 918 coupled to bus 902. Communication interface 918 provides a two-way data communication coupling to one or more network links that are connected to one or more local networks. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN (or WAN component to communicated with a WAN). Wireless links may also be implemented. In any such implementation, communication interface 918 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 918, which carry the digital data to and from computer system 900, are example forms of transmission media.

The computer system 900 can send messages and receive data, including program code, through the network(s), network link and communication interface 918. In the Internet example, a server might transmit a requested code for an application program through the Internet, the ISP, the local network and the communication interface 918.

The received code may be executed by processor 904 as it is received, and/or stored in storage device 910, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 900.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method for influencing slice policies in a wireless network device comprising:
   receiving slice data, at a Charging Function (CHF) of a communication network, from a plurality of Policy Control Functions (PCFs), wherein the CHF is configured to implement monitor and charge functionalities based on traffic flow, and the plurality of PCFs are configured to make Policy and Charging Control (PCC) decisions based on spending limits that are stored in individual policy counters by the CHF;
   determining, by the CHF of the communication network, a policy counter based on the slice data, wherein the policy counter corresponds with at least one of a slice usage rate, a slice usage, a slice action, and a slice User Equipment Route Selection Policy (URSP) target, wherein the policy counter corresponds with a subscriber that utilizes a plurality of slices for data transfer on the communication network, and wherein each slice of the plurality of slices correspond with a PCF of the plurality of PCFs, respectively;
   using the policy counter, determining an overall data usage or quality of service (QoS) experienced by the subscriber using the plurality of slices; and transmitting an electronic communication to the PCF of the plurality of PCFs from the CHF, wherein the electronic communication triggers the slice action by the PCF based on the policy counter.

2. The computer-implemented method of claim 1, wherein the CHF of the communication network is an enhanced CHF with additional functionality of a Multi-Slice Policy Enabler Function (MPEF).

3. The computer-implemented method of claim 1, wherein the policy counter is associated with a real-time slice consumption rate of a subscriber plan or a family plan.

4. The computer-implemented method of claim 1, wherein the policy counter is associated with a leftover quota on a given slice.

5. The computer-implemented method of claim 1, wherein the policy counter is associated with instructing the PCF of the plurality of PCFs to perform an action to execute locally at the PCF.

6. The computer-implemented method of claim 1, wherein the CHF comprises an multi-slice policy enabler function (MPEF) to allocate quotas.

7. The computer-implemented method of claim 1, further comprising:
generating an alert notification that includes slice quota consumption details of each slice of the plurality of slices; and
transmitting the alert notification to the subscriber.

8. The computer-implemented method of claim 1, wherein the overall data usage is associated with a family, enterprise, or group plan.

9. The computer-implemented method of claim 1, wherein the slice action is based on parenting controls set by the subscriber in a family, enterprise, or group plan.

10. The computer-implemented method of claim 1, wherein the slice action moves the subscriber to a different slice of the plurality of slices based on a slice congestion of a slice currently used by the subscriber.

11. A computer-implemented method for influencing slice policies in a wireless network device comprising:
receiving a plurality of slice data, at a Charging Function (CHF) of a communication network, from a plurality of Policy Control Functions (PCFs), wherein a subset of the plurality of slice data corresponds with a PCF from the plurality of PCFs, and wherein the CHF is configured to implement monitor and charge functionalities based on traffic flow, and the plurality of PCFs are configured to make Policy and Charging Control (PCC) decisions based on spending limits that are stored in individual policy counters by the CHF;
receiving, by the CHF of the communication network, subscriber information, wherein the subscriber information includes a minimum quality of service (QoS) value associated with the subset of the plurality of slice data, wherein the subset of the plurality of slice data corresponds with the subscriber and a subset of the plurality of slices;
comparing an actual QoS value with the minimum QoS value; and
when the actual QoS value is less than the minimum QoS value, transmitting an electronic communication to a PCF of the plurality of PCFs from the CHF, wherein the electronic communication triggers a slice action by the PCF on the subset of the plurality of slices to increase the actual QoS value.

12. The computer-implemented method of claim 11, wherein the CHF of the communication network is an enhanced CHF with additional functionality of a Multi-Slice Policy Enabler Function (MPEF).

13. The computer-implemented method of claim 11, further comprising:
generating an alert notification that includes the subset of the plurality of slice data; and
transmitting the alert notification to the subscriber.

14. The computer-implemented method of claim 11, wherein overall data usage associated with the plurality of slice data is associated with a family, enterprise, or group plan.

15. The computer-implemented method of claim 11, wherein the slice action is based on parenting controls set by the subscriber in a family or group plan.

16. A computer system for influencing slice policies in a wireless network device, the computer system comprising:
a memory; and
one or more processors that are configured to execute machine readable instructions stored in the memory that operate the one or more processors to:
receive slice data, at a Charging Function (CHF), from a plurality of Policy Control Functions (PCFs), wherein the CHF is configured to implement monitor and charge functionalities based on traffic flow, and the plurality of PCFs are configured to make Policy and Charging Control (PCC) decisions based on spending limits that are stored in individual policy counters by the CHF;
determine, by the CHF, a policy counter based on the slice data, wherein the policy counter corresponds with at least one of a slice usage rate, a slice usage, a slice action, and a slice User Equipment Route Selection Policy (URSP) target, wherein the policy counter corresponds with a subscriber that utilizes a plurality of slices for data transfer on a communication network, and wherein each slice of the plurality of slices correspond with a PCF of the plurality of PCFs, respectively;
using the policy counter, determine an overall data usage or quality of service (QoS) experienced by the subscriber using the plurality of slices; and
transmit an electronic communication to the PCF of the plurality of PCFs from the CHF, wherein the electronic communication triggers the slice action by the PCF based on the policy counter.

17. The computer system of claim 16, wherein the CHF is an enhanced CHF with additional functionality of a Multi-Slice Policy Enabler Function (MPEF) in the communication network.

18. The computer system of claim 16, wherein the policy counter is associated with a real-time slice consumption rate of a subscriber plan or a family plan.

19. The computer system of claim 16, wherein the policy counter is associated with a leftover quota on a given slice.

20. The computer system of claim 16, wherein the policy counter is associated with instructing the PCF of the plurality of PCFs to perform an action to execute locally at the PCF.

* * * * *